(12) United States Patent
Soliman

(10) Patent No.: US 8,798,029 B2
(45) Date of Patent: Aug. 5, 2014

(54) ULTRA WIDEBAND ASSISTED INITIAL ACQUISITION

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1085 days.

(21) Appl. No.: 12/187,339

(22) Filed: Aug. 6, 2008

(65) Prior Publication Data

US 2010/0035629 A1 Feb. 11, 2010

(51) Int. Cl.
*H04J 3/06* (2006.01)

(52) U.S. Cl.
USPC .......................................... 370/350

(58) Field of Classification Search
USPC ............... 455/455, 434, 436–444, 450, 516, 455/550.1, 552.1, 553.1, 556.1, 556.2, 11.1, 455/13.1, 13.2, 432.1, 502, 76, 151.2, 455/165.1, 183.1, 41.2; 370/310.2, 328, 370/338, 331, 350, 330, 304, 324, 503, 370/509–514
See application file for complete search history.

(56) References Cited

U.S. PATENT DOCUMENTS

| | | | |
|---|---|---|---|
| 6,208,870 B1 | 3/2001 | Lorello et al. | |
| 6,512,930 B2 | 1/2003 | Sandegren | |
| 7,263,351 B2 | 8/2007 | Ross et al. | |
| 7,299,009 B2 | 11/2007 | Hussmann | |
| 7,324,815 B2 | 1/2008 | Ross et al. | |
| 7,508,799 B2 | 3/2009 | Sumner et al. | |
| 7,613,426 B2 * | 11/2009 | Kuehnel et al. | 455/41.2 |
| 7,768,977 B2 * | 8/2010 | Camp, Jr. | 370/332 |
| 2001/0034224 A1 | 10/2001 | McDowell et al. | |
| 2005/0058102 A1 | 3/2005 | Santhoff et al. | |
| 2005/0090200 A1 * | 4/2005 | Karaoguz et al. | 455/41.2 |
| 2005/0094593 A1 * | 5/2005 | Buckley | 370/328 |
| 2005/0099972 A1 | 5/2005 | Motegi et al. | |
| 2005/0271018 A1 | 12/2005 | Liu et al. | |

(Continued)

FOREIGN PATENT DOCUMENTS

| | | |
|---|---|---|
| CN | 1636329 A | 7/2005 |
| DE | 102006029664 | 1/2008 |

(Continued)

OTHER PUBLICATIONS

International Search Report & Written Opinion—PCT/US2009/052591, International Search Authority—European Patent Office—Dec. 1, 2009.

(Continued)

*Primary Examiner* — San Htun

(57) ABSTRACT

A method is provided for reducing the search space of an acquiring ultra wideband (UWB) device seeking to join an UWB communication system, such as a Multi-band orthogonal frequency divisional multiplexing (OFDM) UWB system, by providing wireless network information, such as the hopping pattern or Time-Frequency Code (TFC), timing and frequency information to the acquiring UWB device. The wireless network information is provided using a short range wireless module such as Bluetooth that may coexist with a UWB device. For example, an assisting UWB device, via a short range Bluetooth device module, may convey initial synchronization information, to the acquiring UWB device that also may have a coexisting UWB module. By knowing the TFC, timing and frequency information the acquiring UWB device may know the approximate beginning of the superframes of the UWB devices in the UWB communication system which may help reduce power consumption and probability of false alarm.

57 Claims, 15 Drawing Sheets

(56) References Cited

U.S. PATENT DOCUMENTS

| | | | |
|---|---|---|---|
| 2005/0282494 A1* | 12/2005 | Kossi et al. | 455/41.2 |
| 2006/0013160 A1* | 1/2006 | Haartsen | 370/328 |
| 2006/0045134 A1* | 3/2006 | Eldon et al. | 370/503 |
| 2006/0187858 A1 | 8/2006 | Kenichi et al. | |
| 2007/0183374 A1* | 8/2007 | Classon et al. | 370/338 |
| 2008/0003946 A1 | 1/2008 | Lee et al. | |
| 2008/0070504 A1 | 3/2008 | Benkert et al. | |
| 2009/0022103 A1 | 1/2009 | Shatsky | |
| 2009/0221283 A1 | 9/2009 | Soliman | |

FOREIGN PATENT DOCUMENTS

| | | |
|---|---|---|
| JP | 2005142967 A | 6/2005 |
| JP | 2005260486 A | 9/2005 |
| JP | 2008011040 A | 1/2008 |
| KR | 20080098649 A | 11/2008 |
| WO | WO03039009 A2 | 5/2003 |
| WO | WO2004077752 | 9/2004 |
| WO | 2007092670 A2 | 8/2007 |
| WO | 2008020216 A1 | 2/2008 |
| WO | WO2008024099 | 2/2008 |
| WO | WO2009022801 | 2/2009 |

OTHER PUBLICATIONS

Taiwan Search Report—TW098126579—TIPO—Nov. 2, 2012.
Bluetooth Specification Version 2.1 EDR (vol. 1), published Jul. 26, 2007, by the Promoter Members of Bluetooth SIG, Inc.
Lsaksson L., et al., "Validation of Simulations of Bluetooth's Frequency Hopping Spread Spectrum Technique," Proceedings of Advanced Simulation Technologies Conference, Arlington, Virginia, 2004, pp. 156-165.
Standard ECMA-368 "High Rate Ultra Wideband PHY and MAC Standard," Dec. 1, 2005, 1st Edition, pp. 1-312.
Welsh E., et al., "Improving connection time for Bluetooth devices in Mobile environments," Proceedings of the International Conference on Fundamentals of Electronics, Communications and Computer Sciences, 2002.

* cited by examiner

|  | Band Group #1 | Band Group #2 | Band Group #3 | Band Group #4 | Band Group #5 | Band Group #6 |
|---|---|---|---|---|---|---|
| TFC #1 | 1,2,3,1,2,3 | 4,5,6,4,5,6 | 7,8,9,7,8,9 | 10,11,12,10,11,12 | N/A | 9,10,11,9,10,11 |
| TFC #2 | 1,3,2,1,3,2 | 4,6,5,4,6,5 | 7,9,8,7,9,8 | 10,12,11,10,12,11 | N/A | 9,10,11,9,10,11 |
| TFC #3 | 1,1,2,2,3,3 | 4,4,5,5,6,6 | 7,7,8,8,9,9 | 10,10,11,11,12,12 | N/A | 9,9,10,10,11,11 |
| TFC #4 | 1,1,3,3,2,2 | 4,4,6,6,5,5 | 7,7,9,9,8,8 | 10,10,12,12,11,11 | N/A | 9,9,10,10,11,11 |
| TFC #5 | 1,1,1,1,1,1 | 4,4,4,4,4,4 | 7,7,7,7,7,7 | 10,10,10,10,10,10 | 13,13,13,13,13,13 | 9,9,9,9,9,9, |
| TFC #6 | 2,2,2,2,2,2 | 5,5,5,5,5,5 | 8,8,8,8,8,8 | 11,11,11,11,11,11 | 14,14,14,14,14,14 | 10,10,10,10,10,10 |
| TFC #7 | 3,3,3,3,3,3 | 6,6,6,6,6,6 | 9,9,9,9,9,9 | 12,12,12,12,12,12 | N/A | 11,11,11,11,11,11 |
| TFC #8 | 1,2,1,2,1,2 | 4,5,4,5,4,5 | 7,8,7,8,7,8 | 10,11,10,11,10,11 | 13,14,13,14,13,14 | 9,10,9,10,9,10 |
| TFC #9 | 1,3,1,3,1,3 | 4,6,4,6,4,6 | 7,9,7,9,7,9 | 10,12,10,12,10,12 | N/A | 9,11,9,11,9,11 |
| TFC #10 | 2,3,2,3,2,3 | 5,6,5,6,5,6 | 8,9,8,9,8,9 | 11,12,11,12,11,12 | N/A | 10,11,10,11,10,11 |

FIGURE 2

| | Band Group # 1 | Band Group # 2 | Band Group # 3 | Band Group # 4 | Band Group # 5 | Band Group # 6 |
|---|---|---|---|---|---|---|
| TFC # 1 | Channel # 09 | Channel # 17 | Channel # 25 | Channel # 33 | N/A | Channel # 49 |
| TFC # 2 | Channel # 10 | Channel # 18 | Channel # 26 | Channel # 34 | N/A | Channel # 50 |
| TFC # 3 | Channel # 11 | Channel # 19 | Channel # 27 | Channel # 35 | N/A | Channel # 51 |
| TFC # 4 | Channel # 12 | Channel # 20 | Channel # 28 | Channel # 36 | N/A | Channel # 52 |
| TFC # 5 | Channel # 13 | Channel # 21 | Channel # 29 | Channel # 37 | Channel # 45 | Channel # 53 |
| TFC # 6 | Channel # 14 | Channel # 22 | Channel # 30 | Channel # 38 | Channel # 46 | Channel # 54 |
| TFC # 7 | Channel # 15 | Channel # 23 | Channel # 31 | Channel # 39 | N/A | Channel # 55 |
| TFC # 8 | Channel # 72 | Channel # 80 | Channel # 88 | Channel # 96 | Channel # 104 | Channel # 112 |
| TFC # 9 | Channel # 73 | Channel # 81 | Channel # 89 | Channel # 97 | N/A | Channel # 113 |
| TFC # 10 | Channel # 74 | Channel # 82 | Channel # 90 | Channel # 98 | N/A | Channel # 114 |

FIGURE 3

ULTRA WIDEBAND ASSISTED INITIAL ACQUISITION

BACKGROUND

1. Field

At least one feature relates to acquisition of ultra wideband communication networks, and, more particularly, to a method for assisting a communication device to improve ultra wideband wireless network acquisition time by obtaining information from other communication devices already in the network.

2. Background

Ultra-wideband (UWB) is a radio technology that can be used at very low energy levels for short-range high-bandwidth communications by using a large portion of the radio spectrum. However, one of the challenges of the current UWB technology is the relatively long initial acquisition time, i.e. the time for a transmitter and receiver to achieve initial synchronization. The long acquisition time is a result of the large number of channels associated with UWB European Computer Manufacturers Association (ECMA) 368 standards which create a large initial search space.

The current UWB standard supports sixty (60) different channels. When a UWB communication device seeks to acquire the network, it is initially turned On and has to search all the different channels to detect the physical layer (PHY) frame preamble which is used to acquire the network. Additionally, the UWB communication device has to detect beacons during the beacon period, which occupies the first portion of the medium access control (MAC) superframe, which is 65 ms long. If the UWB communication device does not know the beginning of the superframe it has to keep searching until it detects the beacons. Due to the scanning performed by the UWB communication device to detect the network, the acquisition process may take a noticeably long time. Consequently, a way is needed to expedite and/or improve the acquisition process so that the UWB communication device may acquire a UWB network, such as a Multi-band (MB) Orthogonal Frequency Division Multiplexing (OFDM) UWB system, more quickly.

SUMMARY

One feature provides an acquiring access terminal that may be configured to use the assistance of other nearby terminals to initially acquire a first wireless network. The acquiring access terminal may broadcast a request for a first wireless network information over a second wireless network. The access terminal may be starting or resuming operations in an unknown personal area network when it broadcasts the request for the first wireless network information. The access terminal may then receive the first wireless network information from an assisting access terminal over the second wireless network. The received first wireless network information includes at least one of a time-frequency code, a frequency, a channel, timing information, a scrambling code and phase for the first wireless network.

Along with the first wireless network information, the access terminal may also receive clock timing information from the assisting access terminal via the second wireless network. It may use the clock timing information to align a first clock of the access terminal to a second clock of the assisting access terminal to synchronize data exchange periods over the first wireless network. The access terminal uses the received clock timing information to adjust the first wireless network information by compensating for drift of a common oscillator of the assisting access terminal.

The access terminal may then detect a first wireless network based on the received first wireless network information. In one embodiment, detecting the first wireless network based on the received first wireless network information may include tuning a first communication interface to a frequency band identifiable by the received first wireless network information. The access terminal can then awaken the first communication interface immediately before the expected start of a broadcasted physical layer (PHY) frame preamble. In one embodiment, the length of the PHY frame preamble may be less than twenty-four symbols.

The access terminal may acquire communication service over the first wireless network. The first wireless network may be detected, and the communication service may be acquired, via a first communication interface. The request may be broadcasted, and the first wireless network information may be received, via a second communication interface, the first wireless network can be a different type than the second wireless network.

At least one of the first wireless network and second wireless network may be a peer-to-peer network. In one example, the first wireless network may be an ultra wide band network while the second wireless network may be a Bluetooth-compliant network. In one embodiment, at least one of the first communication interface and second communication interface may be a short range communication interface.

According to another feature, an assisting access terminal may be provided for assisting an acquiring access terminal in initial network acquisition. The assisting access terminal may maintain first wireless network information for a first wireless network associated with a first communication interface. A request for the first wireless network information may be received from the acquiring access terminal over a second communication interface associated with a second wireless network. As a result, the assisting access terminal may send the first wireless network information to the acquiring access terminal via the second communication interface. The first wireless network information sent may include at least one of a time-frequency code, a frequency, a channel, timing information, a scrambling code and phase for the first wireless network. Additionally, the assisting access terminal may send clock timing information to the acquiring access terminal via the second wireless network to assist the acquiring access terminal to synchronize data exchange periods over the first wireless network.

At least one of the first wireless network and second wireless network may be a peer-to-peer network. In one implementation, the first wireless network may be an ultra wide band (UWB) network while the second wireless network may be a Bluetooth-compliant network. In one embodiment, at least one of the first communication interface and second communication interface may be a short range communication interface.

The various features describe herein may be implemented within a wireless device, a circuit or processor incorporated in a wireless device, and/or software.

BRIEF DESCRIPTION OF THE DRAWINGS

Various features, nature, and advantages may become apparent from the detailed description set forth below when taken in conjunction with the drawings in which like reference characters identify correspondingly throughout.

FIG. 2 is a chart illustrating examples of time-frequency code (TFC) patterns for ten (10) TF codes which spread data symbols for a given piconet over all available bands in a band group.

FIG. 3 is a chart illustrating an example of a physical layer (PHY) channelization scheme of the TFCs of FIG. 2.

DETAILED DESCRIPTION

Figure 1:
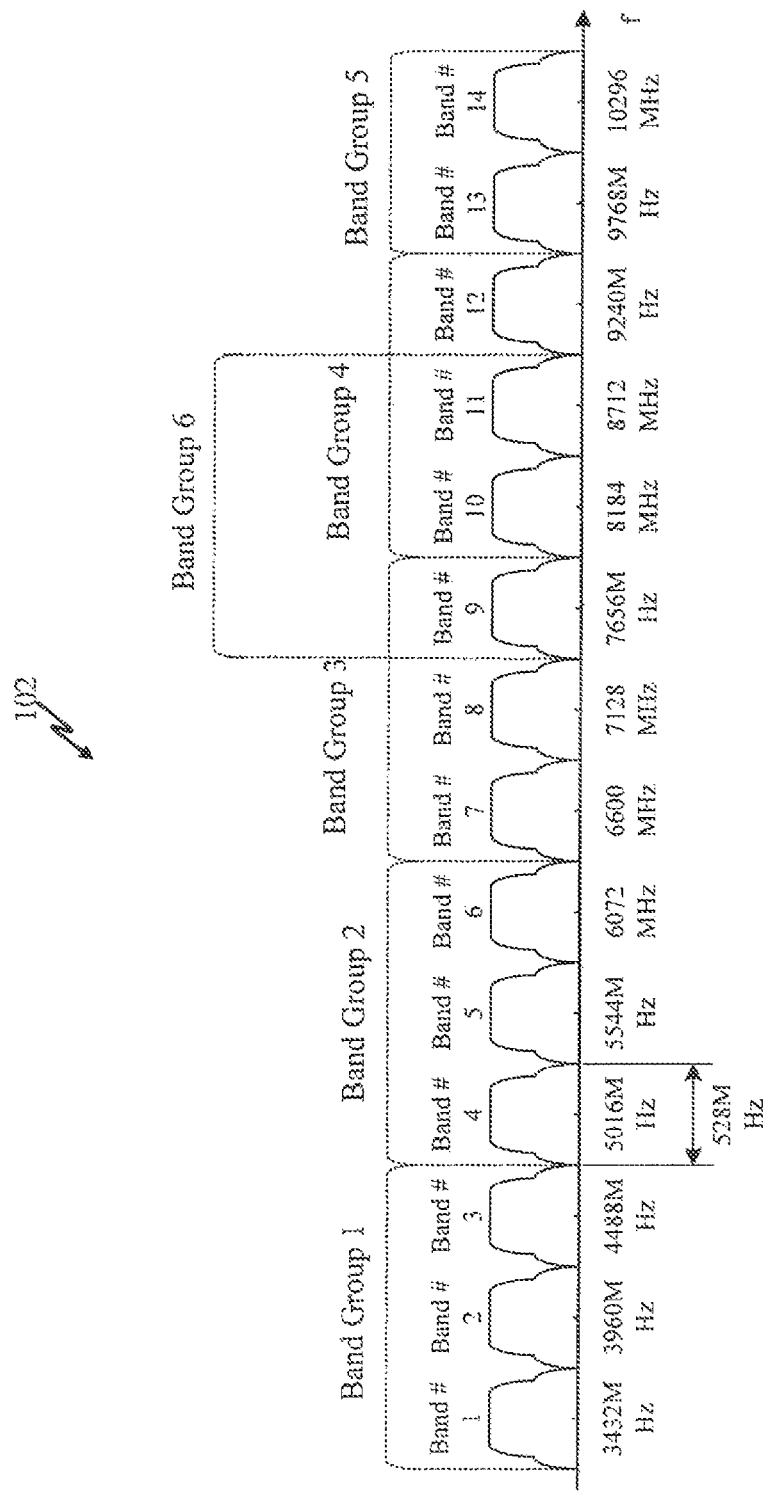
FIG. 1 illustrates an example of an ECMA 368 Ultra-Wideband (UWB) frequency spectrum for Multi-band Orthogonal Frequency Division Multiplexing (MB-OFDM).

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the following description, certain terminology is used to describe certain features. The terms "access terminal", "communication device" and "UWB radio" may be interchangeably used to refer to a mobile device, mobile phone, wireless terminal, access terminal and/or other types of mobile or fixed communication apparatus capable of communicating over an UWB wireless network or system. The term "wireless network" and "communication system" may be interchangeably used to refer to a short range communication system, such as a Multi-band Orthogonal Frequency Division Multiplexing (OFDM) UWB system.

Overview

It is contemplated that some mobile devices or access terminals may support multiple different radio technologies. Such mobile devices or access terminals may include different communication interfaces that allow the terminals to communicate over different networks (e.g., UWB, Bluetooth, etc.). This multi-radio characteristic may allow an acquiring device to use the information obtained via a first network interface from a nearby assisting device to enhance the operation of a second network interface. For example, the first network interface may be a short range Bluetooth radio interface used for communications over a first network. The second network interface may be a UWB radio interface used for communications over a second network. In one example, the acquiring device may utilize its Bluetooth radio interface to obtain initial synchronization information for a UWB network from the assisting device and use it for its UWB radio interface. This feature assumes that the assisting device that has both types of interfaces and has already joined the UWB network of interest.

According to one feature, to reduce the initial network acquisition time for a UWB interface or module within a UWB wireless network, an acquiring access terminal may take advantage of other nearby assisting access terminals. The assisting terminals, mobile or fixed, may have already acquired wireless network information for the UWB wireless network, such as a Multi-band Orthogonal Frequency Division Multiplexing (OFDM) UWB network. The assisting terminals may provide this wireless network information, such as the time-frequency code, to the acquiring terminal. The acquiring terminal may utilize a second communication interface (e.g., Bluetooth interface) to obtain the wireless network information for the UWB wireless network and thereby speed up the process of initial acquisition of a Multi-band OFDM UWB network. As a result, an acquiring access terminal having a UWB communication interface or module can avoid a long scanning or acquisition process and more quickly acquire the OFDM UWB network. In other words, the slow initial acquisition of a UWB network can be improved by using assistance from a nearby device via a second communication interface (i.e., Bluetooth module) that may co-exist with the UWB interface or module.

A method is provided for reducing the search space of a UWB device under consideration, i.e., an acquiring device, by providing the wireless network information, such as the hopping pattern or Time-Frequency Code (TFC), to the UWB device under consideration using another short range wireless module, such as a Bluetooth device, that may coexist with a UWB device on an acquiring terminal. In other words, a UWB device (i.e., in an assisting first terminal) may be used to enhance the performance of another UWB device (i.e., in an acquiring second terminal) in a cooperative way. For example, a Bluetooth radio module of an acquiring terminal may be used to obtain initial synchronization information, i.e. the time-frequency code (TFC), for a UWB device or module. By knowing the TFC, the UWB device under consideration may speed up the process of determining the approximate beginning of the physical layer header of the protocol data unit of the Multi-band OFDM UWB network which may help reduce both power consumption and probability of false alarm. A physical layer convergence protocol (PLCP) may provide a method to convert a service data unit (SDU) into a protocol data unit (PDU). The PLCP PDU (PPDU) may be composed of three components: the PLCP preamble, the PLCP header and the PLCP SDU (PSDU).

Additionally, networking of multiple UWB devices may necessitate that the UWB devices be synchronized so the transmission between the UWB devices may be coordinated so that the receiving devices and transmitting devices know when data transmission may occur. The scheduling of the data transmission may be performed through medium access control (MAC) scheduling. The transmissions may occur during data exchange periods of superframes of the UWB devices. The term "superframe" may denote a division of time comprising a group of one or more contiguous frames of fixed length and may be the time period during which the present channel allocation may be held constant and the next channel allocation may be computed.

As part of facilitating network acquisition, devices may be synchronized by calibrating their respective clocks. Unsynchronized clocks may result in symbol clock frequency error which may play a role in how long in advance an acquiring device i.e. the UWB device under consideration, should start looking for packets or superframes. Therefore, along with providing network information to the acquiring device, the assisting device may also provide information about its clock to help reduce search time. This may allow the acquiring device to calibrate its clock so that it can lock on the desired network more quickly. Reducing the clock errors, by synchronizing the clocks, may result in smaller search windows and improved clock accuracy specification of the UWB symbol clock frequency resulting in improvement (i.e., reduction) in both power consumption and probability of false alarm.

Introduction—UWB Network Example

Ultra wideband (UWB) may permit high-speed transmission of large amounts of data over a relatively broad range of frequency bands, using very low power, at a short range. UWB systems have a capacity proportional to their bandwidth and the logarithm of signal-to-noise ratio (SNR). UWB systems may utilize the signal spreading characteristic that a pulse signal widely spreads in the frequency domain when a very short pulse is transmitted in the time domain. Since trains of short duration pulses are spread to perform communications, UWB systems can shorten the pulse repetition period and lower the transmitted energy density per unit frequency to a level below the energy density for thermal noise. In UWB systems, transmission frequency bands may be determined according to the waveforms of pulses. UWB signal is a form of spread spectrum and hence provide a degree of protection against fading even in the presence of interference. UWB systems may be time-gated, hence may consume less power.

FIG. 1 illustrates an example of an ECMA 368 Ultra-Wideband (UWB) frequency spectrum 102 for Multi-band Orthogonal Frequency Division Multiplexing (MB-OFDM). The spectrum may include fourteen bands, each 528 MHz wide, in the spectral range 3.1 GHz to 10.6 GHz. These bands may be further grouped into five band groups. Band Group #1 may include bands 1-3; Band Group #2 may include bands 4-6; Band Group #3 may include bands 7-9; Band Group #4 may include bands 10-12; and Band Group #5 may include bands 13-14. By having four adjacent groups of three bands, path loss at lower frequencies may be less than at higher frequencies, thus the lower bands may be preferred. Some hardware implementations of UWB physical layer (PHY) can use only one band group, (typically the lowest band group #1), but other PHY implementations can use multiple band groups. The design of a PHY supporting multiple band groups may be simplified by the fact that Band Groups #1 through #5 all have the same bandwidth. Therefore, the PHY transmitter or receiver can tune to any of the first 4 band groups by simply changing a local oscillator frequency. Common filtering and processing before up conversion (at transmitter) or after down conversion (at receiver) may be applied to a 528 MHz wide band regardless of band group chosen thus reducing circuit complexity. In another embodiment, an additional band group #6 may be defined containing bands 9, 10, and 11.

Coded bits may be aggregated into groups of 100 or 200 bits each. Pairs of bits within a group may be modulated, using known modulation techniques such as quadrature phase shift keying (QPSK), onto data tones, typically 100, generally equally spaced in one of the 528 MHz bands. Symbols associated with a unique piconet may be assigned a specific one of the 6 band groups, and may be further assigned a unique time-frequency code within the assigned band group. The band assigned for successive symbols may either change with time or remains constant according to a time frequency code.

Unique logical channels may be defined by using up to ten different time-frequency codes (TFC) for each band group. Time-frequency codes may be hopping patterns used by the ECMA 368 signal. There may be two types of patterns. The first type may be Time-Frequency Interleaved (TFI), and may include signals that hop in various patterns among the three frequency bands in the band group. The second type may be called Fixed-Frequency Interleaved (FFI), in which the signal may not hop but stays in one frequency band. The length of the TFC code may be n symbols (where n is an integer value), so it is repeated at least several times during a packet.

FIG. 2 is a chart 202 illustrating example of the time-frequency code (TFC) patterns for ten TF codes which spread data symbols over all available bands in a band group. The code patterns may determine which of the three (3) (or 2 in the case of Band Group #5) available bands in a band group may be used for successive data symbols from a given piconet. For example, given Band Group #1 and examining TFC 1, data symbols may be transmitted sequentially in band 1, band 2, band 3, band 1, band 2, band 3, repeating indefinitely. The same TFC 1 used in band group 2 may transmit data sequentially in band 4, band 5, band 6, band 4, band 5, band 6, repeating indefinitely. Each network may be assigned one of the band groups and a unique TFC within that band group.

FIG. 3 is a chart 302 illustrating an example of the PHY layer channelization scheme of the TFCs of FIG. 2. The chart 302 shows the mapping of the medium access control (MAC) Channel Number to PHY Band Group and TF Code as well as the TFCs and corresponding repeating sequence of band numbers for successive data symbols, each TFC may be non-varying as a function of time. Unique logical channels may be defined by using up to 10 different TFC codes for each band group. The channel number may take on values from 0-255 (decimals).

In one embodiment, channel numbers 9-15 may be mandatory. Channels using TFCs 1-4 may be time-frequency interleaved (TFI) channels, as described above, and those using TFCs 5-7 may be fixed-frequency interleaved (FFI) channels, described above. As a result of the large number of channels that the acquiring device may need to search through in order to find the correct TFC, UWB initial acquisition may be very slow.

Figure 4:
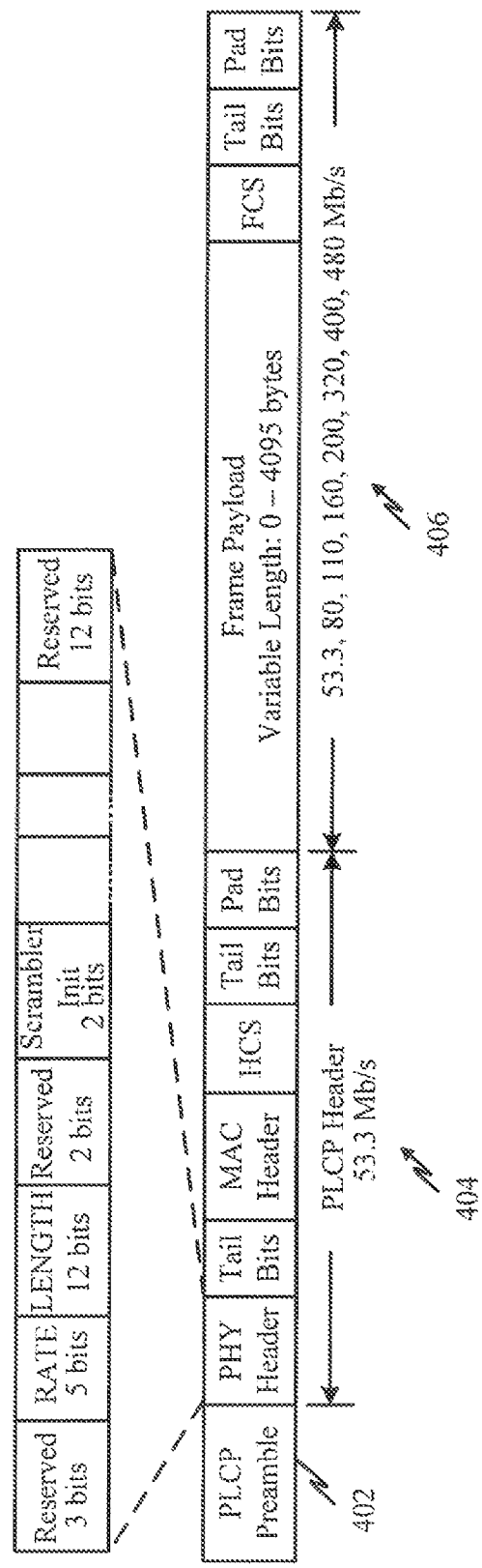
FIG. 4 illustrates an example of a physical layer (PHY) frame structure of a UWB communication system.

FIG. 4 illustrates an example of a physical layer (PHY) frame structure of a UWB communication network. As described above, a physical layer convergence protocol (PLCP) may provide a method to convert a service data unit (SDU) into a protocol data unit (PDU). The PLCP PDU (PPDU) may comprise three components: the PLCP preamble 402, the PLCP header 404 and the PLCP SDU (PSDU) 406. The PLCP header 404 may comprise a physical header ("PHY header"), tail bits or tails symbols ("TS"), a media access control header ("MAC header"), a header check sequence ("HCS"), and pad bits or stuff bits ("SB"). The PSDU 406 may comprise the frame payload, a data SNR+ frame check sequence ("FCS"), tail bits or tail symbols ("TS") and pad bits or stuff bits ("SB").

The preamble 402 may comprise two portions, a time-domain portion for packet/frame synchronization followed by a frequency domain portion for channel estimation. The preamble 402 may be used for synchronization during a transmitting/receiving process, carrier offset compensation and equalization of received signals. A unique preamble sequence may be assigned to each TFC. The PHY header may be used to show information, such as a scrambling code, data rate of an MAC frame and data length. The MAC header may be used to show a frame adjusting signal, a network identifier ("PNID"), a destination identifier ("DestID"), a source identifier ("SrcID"), fragmentation control information and stream index information.

The HCS may be used to detect errors occurring in the PHY header and the MAC header. In the data+FCS, a data field may be used to transmit data with its encryption data. The FCS field may be used for error detection in the data which is being transmitted. Bits in the SB may be a type of dummy bits inserted to generate the data+FCS in a size that may be an integer multiple of the symbol size applied to the desired data rate. As a result, when the size of the data+FCS is an integer multiple of the symbol size applied to the desired data rate, the SB may not need to be inserted.

Figure 5:
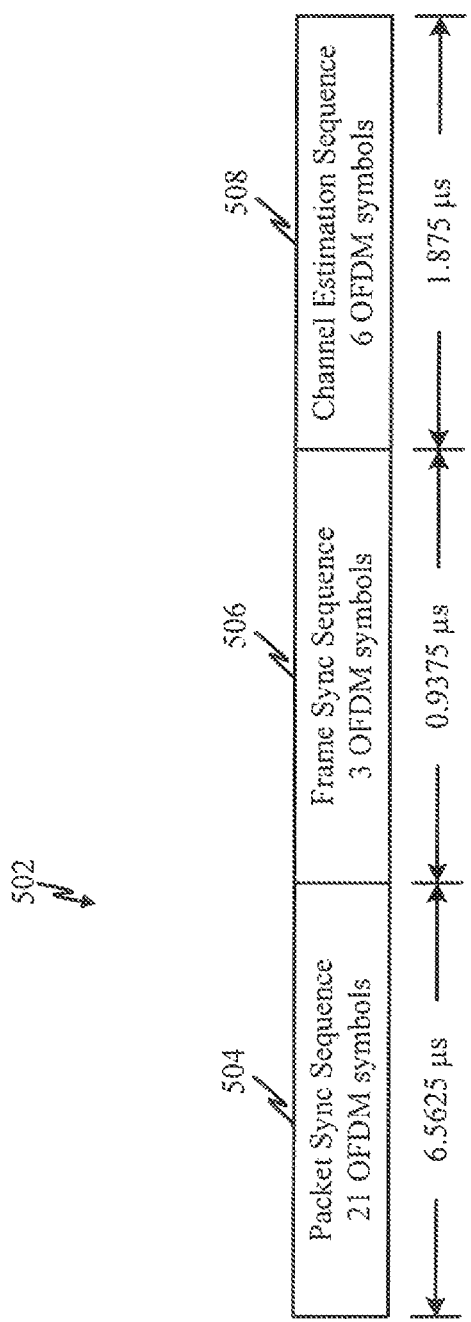
FIG. 5 illustrates an example of a standard preamble frame structure of an ECMA 368 UWB communication system.

FIG. 5 illustrates an example of a standard preamble frame structure 502 of an ECMA 368 UWB communication system. The preamble 502 may be one example of the preamble 402 illustrated in FIG. 4. An acquiring device may use the preamble 502 to acquire the MB OFDM UWB network. The preamble 502 may contain a total of thirty (30) Orthogonal Frequency Division Multiplexing (OFDM) symbols. The first twenty-four (24) preamble symbols 504 and 506 may be used for packet detection, timing estimation, carrier frequency offset (CFO) estimation and frame synchronization. The last six (6) preamble symbols 508 may be used for channel estimation. The ECMA 368 MAC may differentiate itself from the traditional centralized wireless personal area network (WPAN) systems, e.g., Bluetooth and IEEE 802.15.3, by using a synchronized and distributed scheme. The channel time resource may be organized into fixed length superframes, which may comprise two hundred fifty-six (256) Medium Access Slots (MASs).

Figure 6:
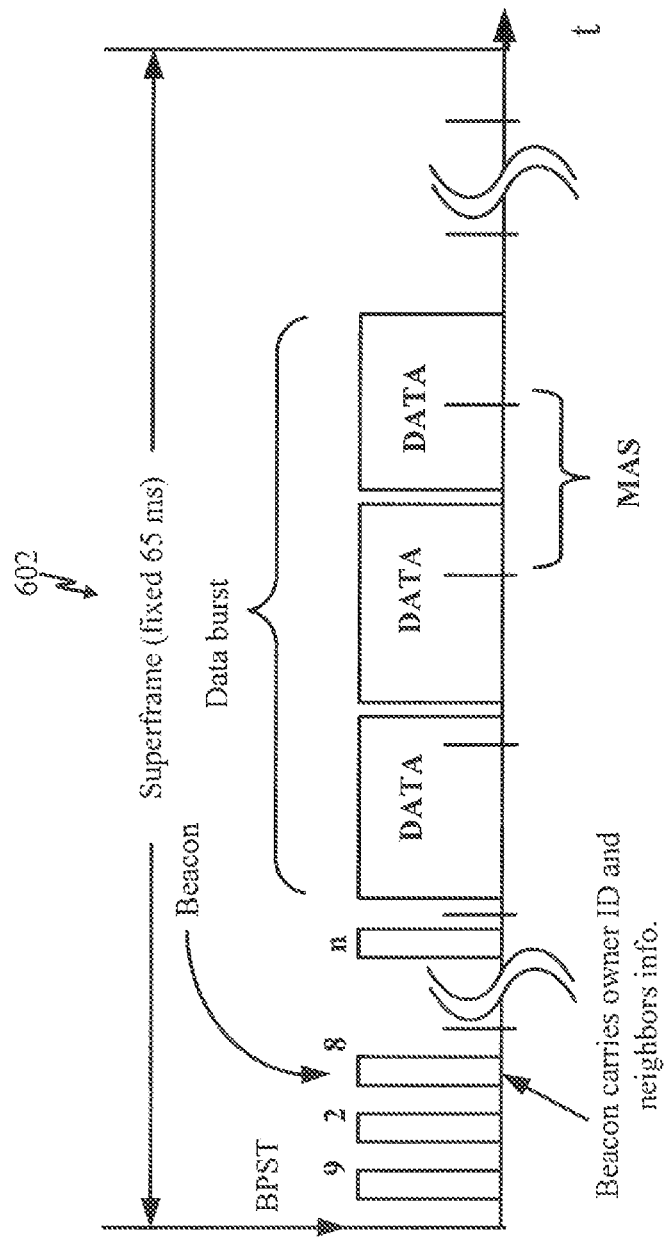
FIG. 6 illustrates an example of a UWB medium access control (MAC) superframe.

FIG. 6 illustrates an example of a UWB medium access control (MAC) superframe. Each MAS may last for 256µ seconds. At the beginning of each superframe 602, a Beacon Period (BP) may comprise n MASs which may be allocated for all devices to exchange beacons. For example, beacons for active devices "9", "2", "8" . . . "n" are illustrated in FIG. 6. The beacon period may have a variable length determined by the number of devices present. Every device may send its beacon in the BP of each superframe. Beacons may be used for maintaining the system synchronization, learning the network topology and coordinating the channel accesses. The remaining time in the superframe may be used for data transfer, namely Data Transfer Period (DTP).

The beacon period may be divided into beacon slots, numbered in sequence, starting at zero. The first 2 beacon slots may be referred to as signaling slots and may be used to extend the BP length of neighbors. All active devices may transmit a beacon in the BP and listen for neighbor's beacons. All devices participating in beaconing in the same beacon period (i.e. devices indicating the same beacon period start time (BPST) in their beacon) may be referred to as a beacon group (BG). A device may be considered to be a member of a beacon group if its beacon has been correctly received in at least one (1) of the previous three (3) superframes.

A set of devices from which a device receives beacons that identify the same starting frame may be referred to as a piconet. That is, all devices that belong to the same piconet may be synchronized in terms of the start of the MAC superframe that may be used as the piconet time reference. When a device wants to join the piconet, it may listen to existing beacon periods. If none are detected, it may initiate a new piconet by transmitting its own beacon. Otherwise, the device may decode all beacons.

Figure 7:
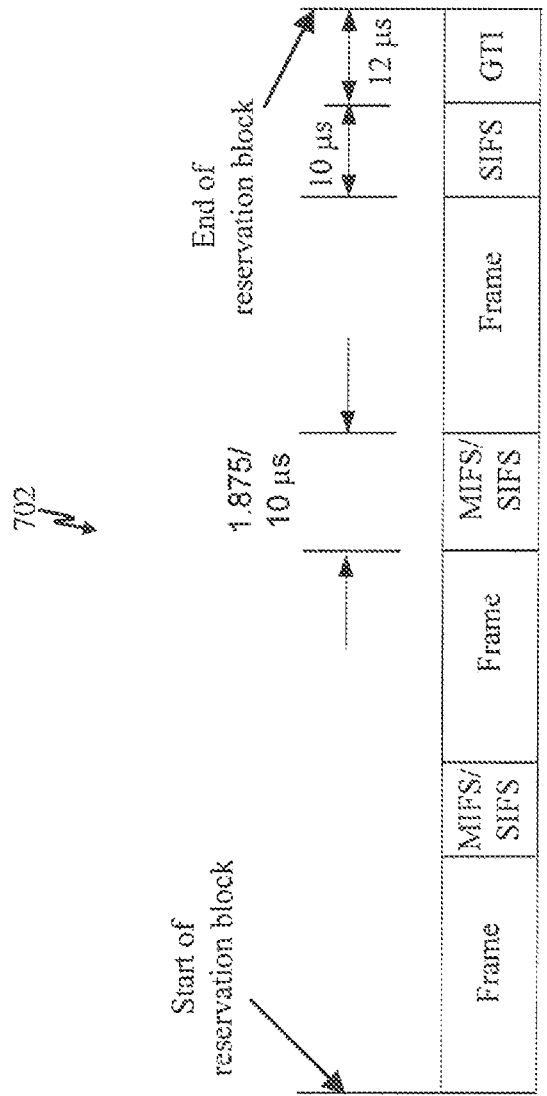
FIG. 7 illustrates a frame transaction in a UWB communication system where the transaction does not provide an acknowledgment.

FIG. 7 illustrates a frame transaction 702 in a UWB communication network where the transaction does not provide an acknowledgment. Preferably, a UWB device may start the search process for an OFDM UWB network before the beacon period of a superframe starts. Otherwise, the UWB device may have to wait until the next beacon period starts which may take at least another 65 ms. If the UWB device can determine when the superframe starts relative to a known reference time, the search process can be shortened by as much as 65 ms. As the search process is reduced, power consumption may be conserved and the operational life of the UWB device may be extended. The search process may be reduced as the device can go back to sleep if it could not find a beacon within the beacon period and wakes up again before the next beacon period. This may be particularly useful where the device is powered by batteries, for example, since it means that the device can operate for longer periods of time between recharging.

Data transmission may be followed by two inter-frame spacings. The first inter-frame spacing may be Short Interframe Spacing (SIFS) or Minimum Inter-Frame Spacing (MIFS) which may correspond to turn around time. The values of MIFS/SIFS may be 1.875µ sec and 10µ sec, respectively. The second inter-frame spacing may be Guard Time Interval (GTI) and may correspond to synchronization error and clock drift between devices. Guard times may apply to all boundaries of distributed reservation protocol (DRP) reservation blocks and beacon periods (BPs). Both SIFS/MIFS and GTI may be considered overhead and result in reducing the MAC efficiency. The GTI may be calculated based on the maximum symbol clock frequency tolerance of ±20 ppm, time duration of MAC superframe, 4 lost beacon periods and clock resolution of 1 µs. A device may begin listening for GTI prior to the start of a DRP reservation block. If the symbol clock frequency drift improves, the GTI may get shorter resulting in less receiver power consumption which may improve MAC efficiency and improve the probability of false alarm.

Figure 8:
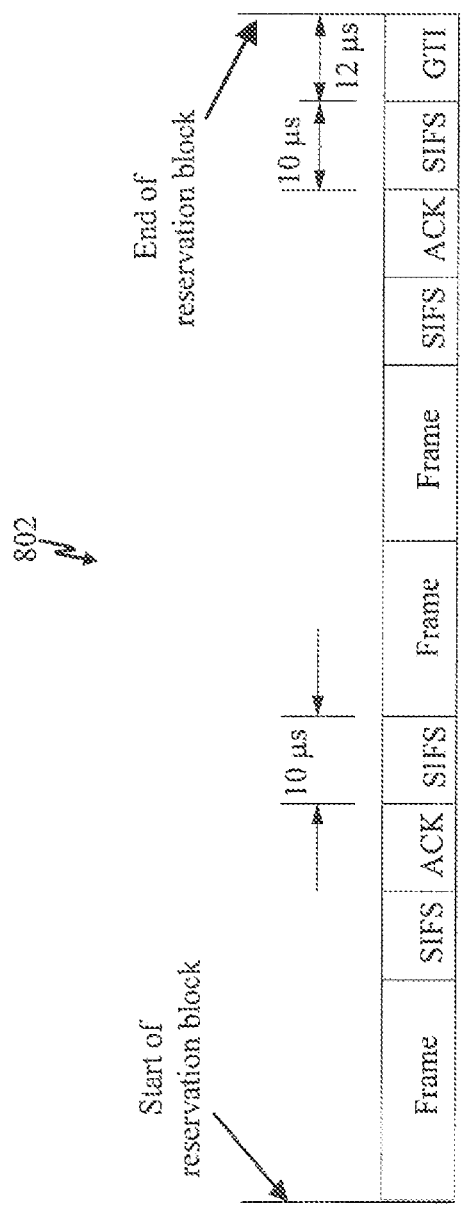
FIG. 8 illustrates a frame transaction in a UWB communication system where the transaction provides an acknowledgment.

FIG. 8 illustrates a frame transaction 802 in a UWB communication network where the transaction provides an immediate acknowledgment (ACK).

Assisted Network Acquisition

Figure 9:
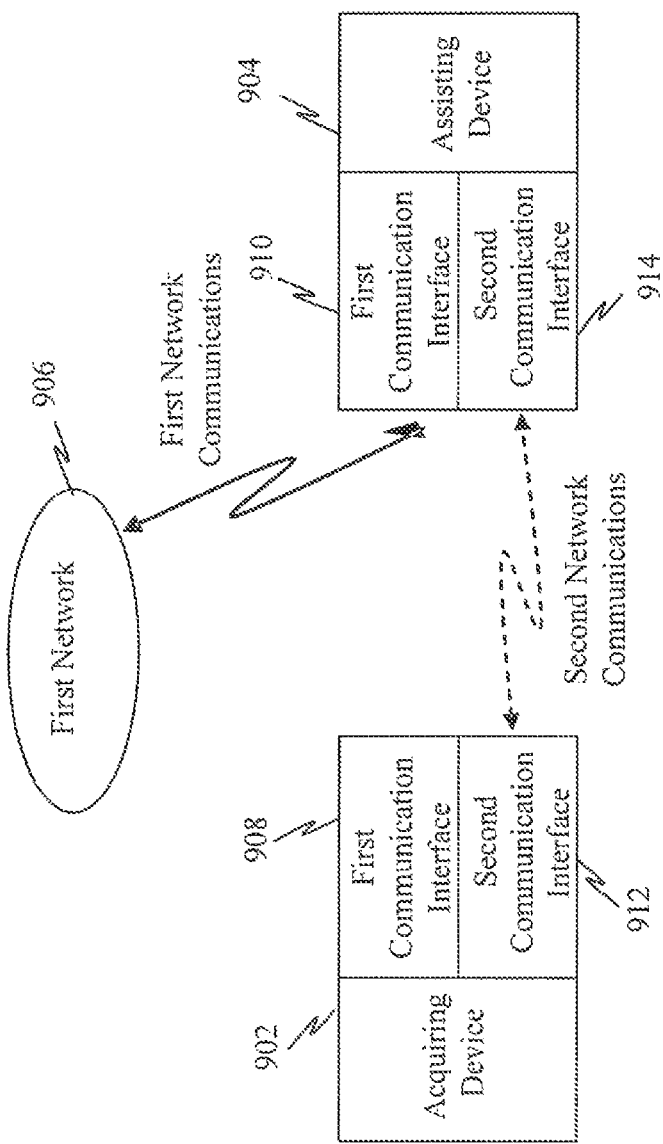
FIG. 9 is a block diagram illustrating an example of how an acquiring first device may obtain first network information from a second device already part of the first network.

FIG. 9 is a block diagram illustrating an example of how an acquiring first device 902 may obtain first network information from a second device already part of the first network. Both the acquiring first device 902 and the assisting second device 904 may have additional network interfaces that support communications over a second network distinct from the first network.

The acquiring first device 902 may have no prior knowledge of the first network it intends to join. However, an assisting device 904 may already have joined or acquired the first network information (e.g., identified communication frequencies, channels, timing, scrambling codes and/or phases, a time frequency code that an assisting device may be using, any synchronization information of the packet and any frequency offset from the carrier frequency etc).

The acquiring and assisting devices 902 and 904 may include first communication interfaces 908 and 910 adapted for communications over the first network 906 and second communication interfaces 912 and 914 adapted for communications over the second network, respectively. According to some examples, the first and second communication interfaces 908, 910, 912, and 914 may facilitate short range communications and/or peer-to-peer communications. In one example, the first and second communication interfaces may support wide area networks, local area networks, personal area communications networks and/or a body area network. For example, the first communication interfaces 908 and 910 may be UWB modules for communicating over an OFDM UWB network. The second communication interfaces 912 and 914 may be Bluetooth-compliant modules for communicating over a Bluetooth network.

Furthermore, networking of the devices 902 and 904 may necessitate that the devices 902 and 904 to be synchronized so the transmission between them can be coordinated. Receiving devices and transmitting devices may know when data transmission between the modules will occur. The scheduling of the data transmission may be performed through medium access control (MAC) scheduling.

In one example, the first communication interfaces 908 and 910 may be UWB devices. The transmission may occur during data exchange periods of superframes of the UWB devices. To properly operate, the data exchange periods of the superframes of the UWB devices may be synchronized. Synchronization may be achieved using beacons. Additionally, guard time may be used at boundaries of DRP reservation blocks and beacon periods (BPs). Guard time intervals may depend on the maximum difference between the devices' MAS boundary times. The difference may arise from synchronization error and clock drift. Synchronization may also be achieved during the BP and the synchronization error may be a function of the MAC clock resolution. Drift may be a function of clock accuracy and the time elapsed since the synchronization event. Synchronization by improving (increasing) the accuracy of the crystals is not preferred as it can be very expensive. The superframes of each UWB device 902 and 904 may be divided into slots of fixed duration. MAC control information may be exchanged through the transmission and reception of beacons in a contention-free manner during initial slots in the superframe. The remaining slots may be available for the exchange of data. The protocol may allow each UWB device 902 and 904 to use beacons to reserve specific slots for data transmission without contention. The superframes of each UWB device 902 and 904 may be synchronized so that data transmission between the UWB devices 902 and 904 occurs at expected times.

Upon starting up, or if service has been lost, the acquiring first device 902 may wish to initiate communications over its first communication interface (e.g., UWB device). Therefore, the first device 902 may scan for other nearby devices using its second communication interface 912. Alternatively, the acquiring first device 902 and assisting second device 904 may have a pre-established association or there may be a pre-established association between their second communication interfaces 912 and 914. In one example, the assisting second device 904 may have already acquired network information for an OFDM UWB network. The acquiring first device 902 may obtain UWB network information from the assisting second device 904 via their second communication interfaces 912 and 914. Such network information may include, for example, its time-frequency code, and other time and/or frequency information that may be used to speed up the initial acquisition process. The first device 902 may then use this network information to acquire UWB network communications via the first communication interface 908.

Another feature of obtaining the network information from the assisting second device 904 is that the acquiring first device 902 may consume less power than if it had performed an exhaustive scan of one or more frequency bands to discover such information itself. Furthermore, the wireless network information may indicate the beginning of the superframe so that the acquiring first device 902 knows when to scan for beacons and does not waste time and energy scanning during times when beacons are not being transmitted. Therefore, power consumption may be conserved and the operational life of the acquiring first device 902 may be extended. This may be particularly useful where the acquiring first device 902 is powered by batteries, for example, since it means that the first device can operate for longer periods of time between recharging.

Assisting Device Clock Drift Compensation

Figure 10:
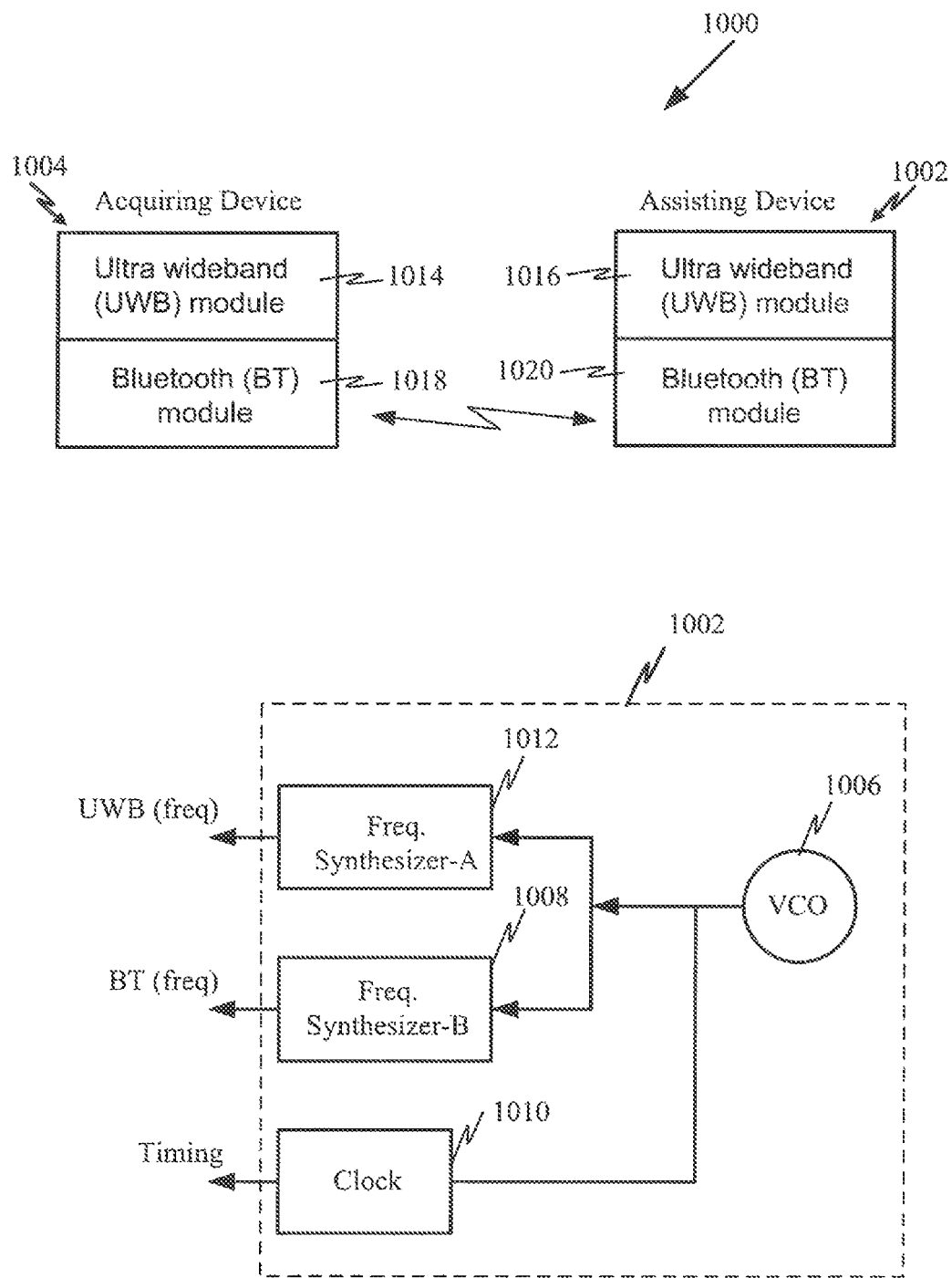
FIG. 10 is a block diagram illustrating an example of how an assisting device may share timing information with and calibrate a clock symbol frequency of an acquiring device.

FIG. 10 is a block diagram 1000 illustrating an example of how an assisting device 1002 may share timing information with and calibrate a clock symbol frequency of an acquiring device 1004. FIG. 10 also includes a block diagram illustrating additional details of the assisting device 1002. For the acquiring device 1002 to properly and efficiently operate, the clocks of the assisting and acquiring devices 1002 and 1004 may be synchronized. As discussed previously, synchronization can be difficult because crystals within the devices that generate clock signals typically drift. To overcome the drift and lack of synchronization and timing, the assisting device 1002 may provide the acquiring device 1004 information as to the drift of its clock 1010 and/or the drift of its common oscillator 1006. The devices 1002 and 1004 may each comprise a UWB module 1014 and 1016 and a Bluetooth (BT) module 1018 and 1020.

If the acquiring device 1004 knows that the clock 1010 of the assisting device 1002 has drifted by a certain amount, the acquiring device 1004 may not have to keep its receiver turned On. By knowing the drift of the clock 1010, i.e. the timing information, this timing information may be sent to the acquiring device 1004. Alternatively, if the BT module 1018 in the acquiring device 1004 is tracking the BT module 1020 in the assisting device 1002 and the UWB module 1014 in the acquiring device 1004 is locked to the BT module 1020 in the assisting device 1002, then the UWB module 1014 in the acquiring device 1004 may closely track the UWB module 1016 in the assisting device 1002. Since superframes may have a specific start time and end time, the timing information may allow the acquiring device 1004 to determine the approximate start of the superframe so that it does not have to turn On its receiver until the start time. As a result, search time for finding the beginning of the superframe may be reduced so that power consumption may be conserved and the operational life of the acquiring device 1004 may be extended.

Additionally, the assisting device 1002 may also calibrate a clock symbol frequency of the acquiring device 1004 as the devices 1002 and 1004 may be tied together, for example through a common oscillator 1006. If the common oscillator (VCO) 1006 has the same drift, the acquiring UWB device 1004 may detect the drift. The common oscillator 1006 may drive a first frequency synthesizer 1008 which may produce the Bluetooth frequencies and a second frequency synthesizer 1012 which may produce the UWB frequencies.

If the acquiring device 1004 knows the drift of the clock 1010 of the assisting device 1002, through the Bluetooth link, the assisting device 1002 may determine how fast the clock 1010 is drifting. Therefore, when the devices 1002 and 1004 communicate, the acquiring device 1004 may know how the common oscillator 1006 (in assisting device 1002) may be drifting and it can communicate this information to its UWB device module 1014. The UWB device module 1014 (for acquiring device 1004) may then know how the frequency for assisting device 1002 is drifting thereby allowing it to more quickly determine the carrier frequency. That is, despite the drift of the oscillator 1006, the UWB module 1014 (for acquiring device 1004) does not have to search around a large spectrum for the carrier frequency. In other words, if the two devices 1002 and 1004 are communicating with each other and the drift of the common oscillator 1006 (for the assisting device 1002) can be determined, the acquiring device 1004 can compensate for this drift. Once the drift for oscillator 1006 is known, the assisting device 1002 may provide this information to the acquiring device 1004 so that it may adjust its drift and thereby provide frequency synchronization.

As a result of accounting for the timing and frequency drift, the UWB packets may be shorter and the initial acquisition time may be improved which may improve the chances of finding the first preamble that is transmitted. This may allow a short preamble to be used from the beginning.

Shortened Preamble/Shorten Awake Lead Time/Improved Efficiency

One result of utilizing assisted acquisition is that acquiring devices do not need a long preamble (e.g., packet synchronization sequence 504 and frame synchronization sequence 506 in FIG. 5) to recognize and/or detect a wireless network of interest. The longer preamble is used for detection of the start of a frame (e.g., by correlation of the preamble to a known symbol sequence). The length of a standard preamble is partially to the necessity of having a receiver positively identify the occurrence of a frame (potentially in the presence of interference) while avoiding false positive identifications. However, by obtaining the synchronization information from an assisting device, the acquiring device has a greater degree of certainty that a frame will be detected at a particular band, frequency and time. Therefore, the preamble can be shortened. Consequently, a standard twenty-four symbol preamble (504 and 506 in FIG. 5) for UWB can be shortened to, for example, less than twenty-four symbols.

Additionally, guard time intervals (such as illustrated in FIG. 7 GTI) are typically used to allow for variations between clocks among a network. Receiving devices start listening during a guard time interval so that they can accurately receive a frame. However, if the network information is provided by another device along with its clock drift information, the accuracy of the network is improved. That is, the receiving device is better synchronized to the network frame and can awaken its receiver within a substantially shorter guard time interval.

The described techniques of assisted acquisition results in improve system efficiency as more packets may be transmitted in the same amount of time. That is, the preamble and guard time intervals may be shortened, thereby allowing more packets to be sent in the same amount of time.

Additionally, power savings may also be achieved since the acquiring device can avoid a potentially long scan of an ultra wide frequency spectrum in order to detect a first access terminal.

Method for Assisted Initial Acquisition

Figure 11:
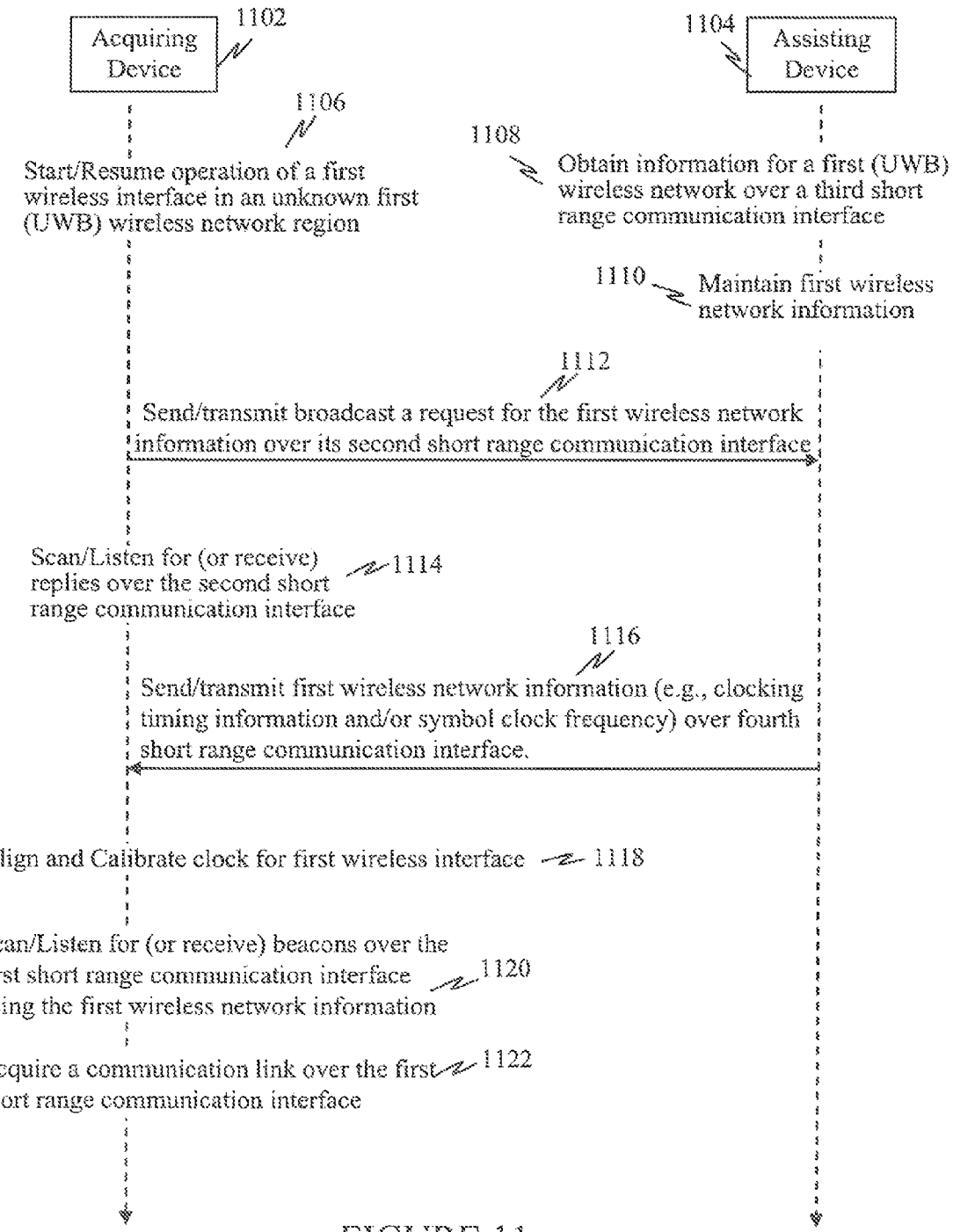
FIG. 11 illustrates a method between two devices to facilitate distribution of wireless network information from an assisting device (i.e., assisting access terminal) to an acquiring device (i.e., acquiring access terminal).

FIG. 11 illustrates a method between two devices to facilitate distribution of wireless network information from an assisting device (e.g., assisting access terminal to an acquiring device (e.g., acquiring access terminal). The acquiring device 1102 may have a first short range wireless communication interface (e.g., UWB module) and a second short range wireless communication interface (e.g. Bluetooth-compliant module) for peer-to-peer and/or ad-hoc communications. Similarly, the assisting device 1104 may have a third short range wireless communication interface (e.g. UWB module) and a fourth short range wireless communication interface (e.g. Bluetooth-compliant module) for peer-to-peer and/or ad-hoc communications. Consequently, the first and third wireless communication interfaces may be used for a first type of wireless network, e.g., UWB network, while the second and fourth wireless communication interfaces may be used for a second type of wireless network, e.g., Bluetooth network.

The acquiring device 1102 may startup or resumes operations of its first wireless interface in an unknown (UWB) wireless network region 1106. The assisting device 1104 may have previously obtained information for the first network (e.g., UWB network) over its third short range communication interface 1008. Consequently, the assisting device 1104 may maintain first wireless network information (e.g., identify time-frequency codes, frequencies, channels, timing, scrambling codes and/or phases, etc., for the first wireless network). The acquiring device 1102 may send or broadcast a request for the first wireless network information over its second short range communication interface 1112 (e.g., a second wireless network). The acquiring device 1102 may scan or listen for replies over its second short range communication interface 1114.

Upon receiving the request from the acquiring device 1102 over its fourth communication interface, the assisting device 1104 may send/broadcast/transmit the first wireless network information (e.g., identify time-frequency codes, frequencies, channels, timing, scrambling codes and/or phases, etc.) along with its clock information (e.g., clocking timing information and/or symbol clock frequency) over its fourth short range communication interface 1116. The acquiring device 1102 may use the timing information to align and/or calibrate its clock for communications over the first wireless interface 1118.

Having received the wireless network information from the assisting device 1104, the acquiring device 1102 may wait until the beacon period to begin scanning/listening for beacons over its first short range communication interface 1120. The acquiring device 1102 may then acquire a communication link to the OFDM UWB system over its first short range communication interface 1122. Because the wireless network information is obtained from the nearby assisting device 1104, the acquiring device knows when to expect the time frequency code (TFC) and quickly acquire communications with an access node for the wireless network while avoiding a long scan for the first network information.

Example of Acquiring Device and Operation Thereof

Figure 12:
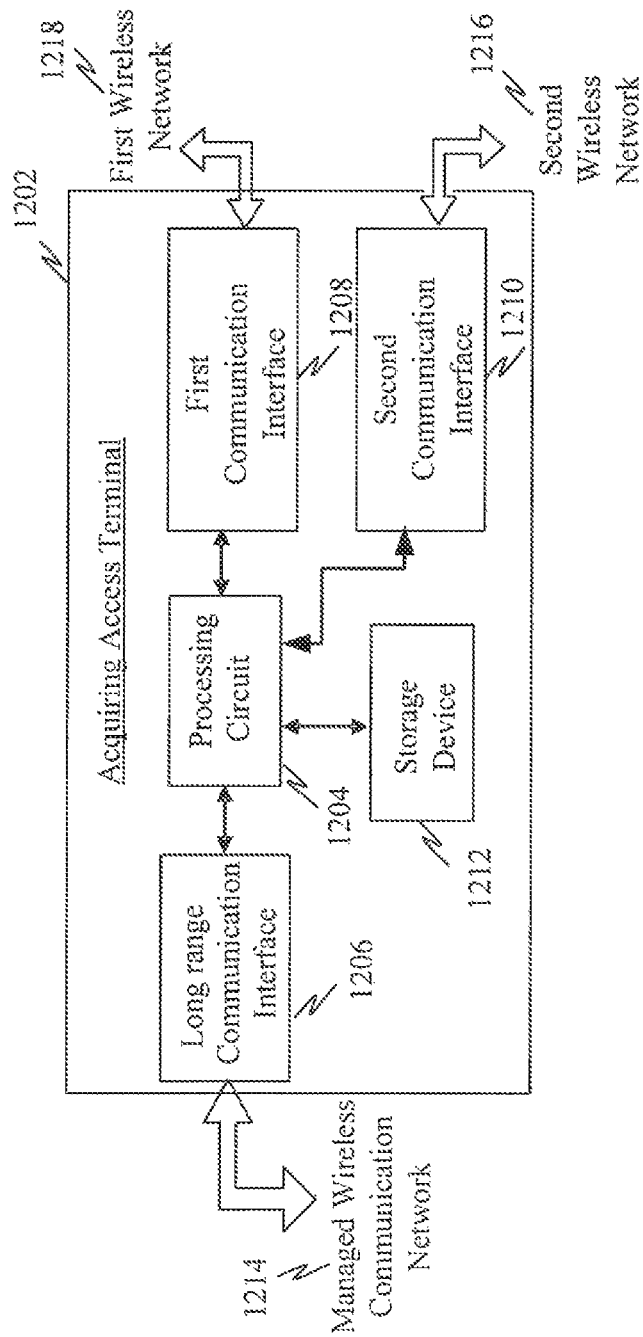
FIG. 12 is a block diagram illustrating an example of an access terminal that may be configured acquire a first wireless network with the assistance of another access terminal.

FIG. 12 is a block diagram illustrating an example of an access terminal that may be configured to acquire a first wireless network with the assistance of another access terminal. The access terminal 1202 may include a processing circuit 1204 coupled to a long range communication interface 1206, a first communication interface 1208, a second communication interface 1210 and/or a storage device 1212. The long range communication interface 1206 and the first and second communication interfaces 1208 and 1210 may be adapted to communicate with different types of networks. The long range communication interface 1206 may serve to communicate over a centrally managed wireless communication network 1214 (e.g., wide area network, Public Land Mobile Network (PLMN), etc.). The first communication interface 1208 may serve to communicate with a first wireless network 1218, such as a personal area network (PAN), an adhoc peer-to-peer network, or a short range network. Similarly, the second communication interface 1210 may serve to communicate over a second wireless network 1216, such as a personal area network (PAN), an adhoc peer-to-peer network, or a short range network. In one example, the first wireless network 1218 may be an ultra wide band (UWB) network and the second wireless network 1216 may be a Bluetooth-compliant network. For instance, the long range communication interface 1206, the first and second communication interfaces 1208 and 1210 may be adapted to communicate over different networks whether in distinct or overlapping frequency bands.

The long range communication interface 1206 may be a high-power communication interface relative to the lower-power first and/or second communication interfaces 1208 and 1210. The access terminal 1202 may use the storage device 1212 to store information for the networks through which it communicates.

Upon an initial startup or resumption after no network service, the acquiring access terminal 1202 may be within a region for an unknown first wireless network 1218. In another scenario, the access terminal 1202 may be switching operations to a new wireless network, where the access terminal 1202 has insufficient knowledge of the new wireless network to acquire communications.

Rather than scanning one or more frequency bands to obtain first wireless network information with which to setup a communication link over the first communication interface 1208, the access terminal 1202 may utilize its second communication interface 1210 to obtain such first network information from another nearby (or assisting) device that is already part of the first wireless network 1214. That is, it may be easier or faster or more power efficient to establish a communication link over the second wireless network. For instance, the second wireless network 1216 may be a low-bandwidth network operating at a particular known frequency (or frequency band) while the first wireless network 1218 may be an higher bandwidth network operating across an ultra wide set of frequencies.

According to various examples, the communication link via the second communication interface 1210 (with another nearby device) may be established in a number of ways. For instance, the acquiring access terminal 1202 may send a request for the first wireless network information in a broadcast via its second communication interface 1210 on a channel monitored by other devices (e.g., without having established a previous relationship with those other devices). Alternatively, the acquiring access terminal 1202 may identify one or more nearby or local devices and send each device a targeted request for the first wireless network information via its second communication interface 1210 with or without a prior relationship being established with those other nearby or local devices. For instance, where the second communication interface 1210 is a Bluetooth-compliant interface, an "acquisition" profile may be established that is recognized by other Bluetooth-compliant devices as a request for local wireless network information (e.g., personal area network information, etc.).

Figure 13:
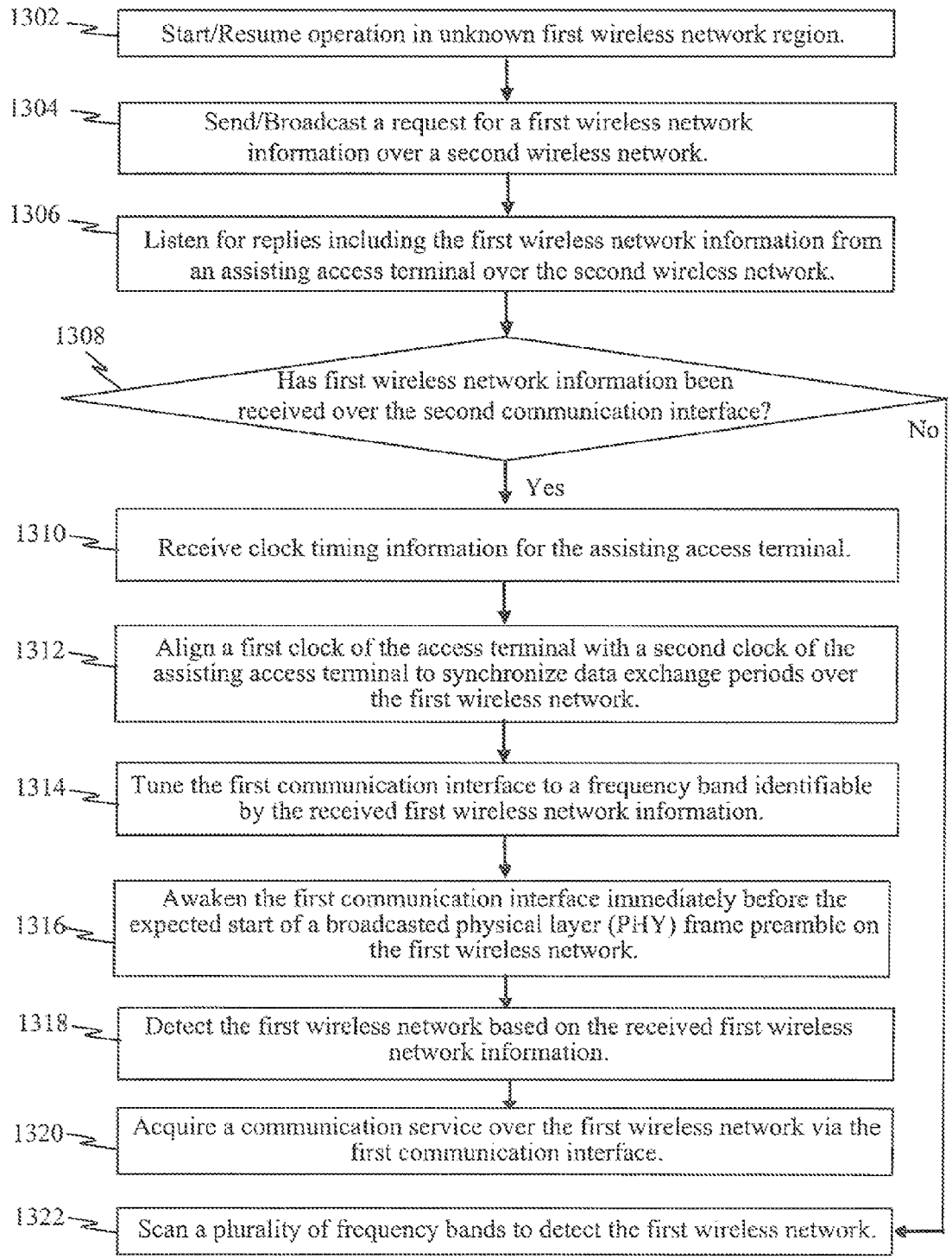
FIG. 13 illustrates a method operational on an acquiring access terminal for performing assisted initial network acquisition according to one example.

FIG. 13 illustrates a method operational on an acquiring access terminal for performing assisted initial network acquisition according to one example. The acquiring access terminal may start or resume operations in an unknown network region when it broadcasts the request for the first wireless network information 1302. A request for a first wireless network information may be broadcasted by the acquiring access terminal over a second wireless network (e.g., over a second wireless interface) 1304. The acquiring access terminal may then listen (over the second wireless interface) for replies including the first wireless network information from an assisting access terminal over the second wireless network 1306. At least one of the first wireless network and second wireless network may be a peer-to-peer network. If no reply is received 1308, then the acquiring access terminal may scan a plurality of frequency bands to detect the first wireless network 1322.

If a reply is received 1308, the received first wireless network information may include at least one of a time-frequency code, a frequency, a channel, timing information, a scrambling code and phase for the first wireless network. The acquiring access terminal may also receive clock timing information from the assisting access terminal via the second wireless network 1310. The acquiring device may use this clock timing information to align a first clock of the access terminal with a second clock of the assisting access terminal to synchronize data exchange periods over the first wireless network 1312. That is, the access terminal may use the received clock timing information to adjust the first wireless network information by compensating for drift of a common oscillator of the assisting access terminal.

The acquiring access terminal may then tune the first communication interface to a frequency band identifiable by the received first wireless network information 1314. The first communication interface may be awakened (from a sleep or low-power state) immediately before the expected start of a broadcasted physical layer (PHY) frame preamble for the first wireless network 1316. The acquiring access terminal may then detect the first wireless network based on the received first wireless network information 1318. The length of the PHY frame preamble may be less than twenty-four symbols. Having detected the first wireless network, the acquiring access terminal may then acquire communication service over the first wireless network (with another device) 1320.

The first wireless network may be detected and the communication service may be acquired via a first communication interface, and the request is broadcasted and the first wireless network information is received via a second communication interface, the first wireless network being of a different type than the second wireless network. In one example, at least one of the first communication interface and second communication interface is a short range communication interface. For instance, the first wireless network may be an ultra wide band network while the second wireless network may be a Bluetooth-compliant network.

As a result of implementing assisted network acquisition, the acquiring access terminal may consume less power than if it had performed an exhaustive scan of one or more frequency bands (as in step 1322) to find beacons or frames identifying the first wireless network. Additionally, since the second communication interface may be a low-power interface, it may consume relatively little power. Therefore, power consumption may be conserved and the operational life of the acquiring access terminal may be extended.

Example of Assisting Device and Operation Thereof

Figure 14:
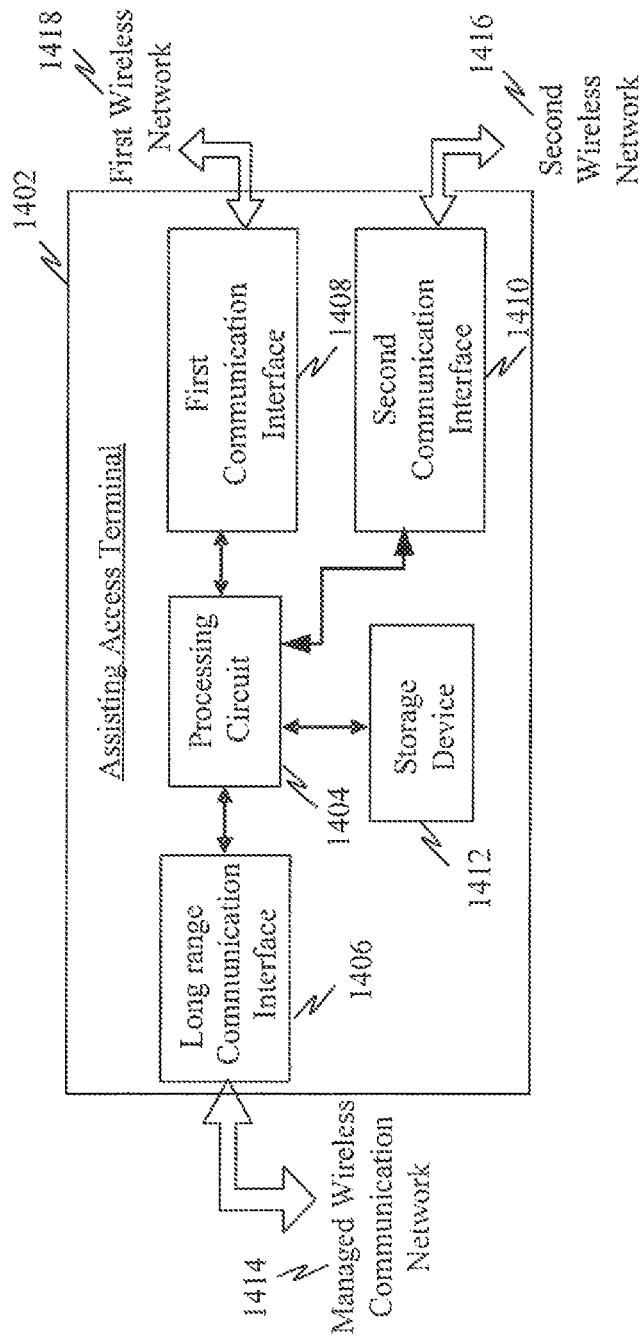
FIG. 14 is a block diagram illustrating an example of an assisting access terminal that may be configured for assisted initial network acquisition.

FIG. 14 is a block diagram illustrating an example of an assisting access terminal that may be configured for assisted initial network acquisition. The assisting access terminal 1402 may include a processing circuit 1404 coupled to a long range communication interface 1406, a first communication interface 1408, a second communication interface 1410, and a storage device 1412. The long range communication interface 1406 and the first and second communication interfaces 1408 and 1410 may be adapted to communicate with different types of networks. The long range communication interface 1406 may serve to communicate over a centrally managed wireless communication network 1414 (e.g., wide area network, PLMN, etc.). The first communication interface 1408 may serve to communicate with a first wireless network 1418, such as a personal area network (PAN), an adhoc peer-to-peer network, or a short range network. Similarly, the second communication interface 1410 may serve to communicate over a second wireless network 1416, such as a personal area network (PAN), an adhoc peer-to-peer network, or a short range network. In one example, the first wireless network 1418 may be an ultra wide band (UWB) network and the second wireless network 1416 may be a Bluetooth-compliant network. For instance, the long range communication interface 1406, the first and second communication interfaces 1408 and 1410 may be adapted to communicate over different networks whether in distinct or overlapping frequency bands. The long range communication interface 1406 may be a high-power communication interface relative to the lower-power first and/or second communication interfaces 1408 and 1410. The access terminal 1402 may use the storage device 1412 to store information for the networks through which it communicates.

The assisting access terminal 1402 may be assumed to be operational on the first wireless network 1418 and/or to have obtained information about the first wireless network, i.e. the personal area network 1418. Such first wireless network information may include, for example, time-frequency codes, a list of the offset frequencies relative to a known reference frequency, and other time and/or code information. The assisting access terminal device 1402 may listen for requests for wireless network information from other nearby devices via its second communication interface 1410. If such request is received, the assisting access terminal 1402 may provide the first wireless network information stored in the storage device 1412, via its second communication interface 1410, to a requesting (acquiring) access terminal thereby assisting the acquiring access terminal in finding a reference beacon for the first wireless network.

Figure 15:
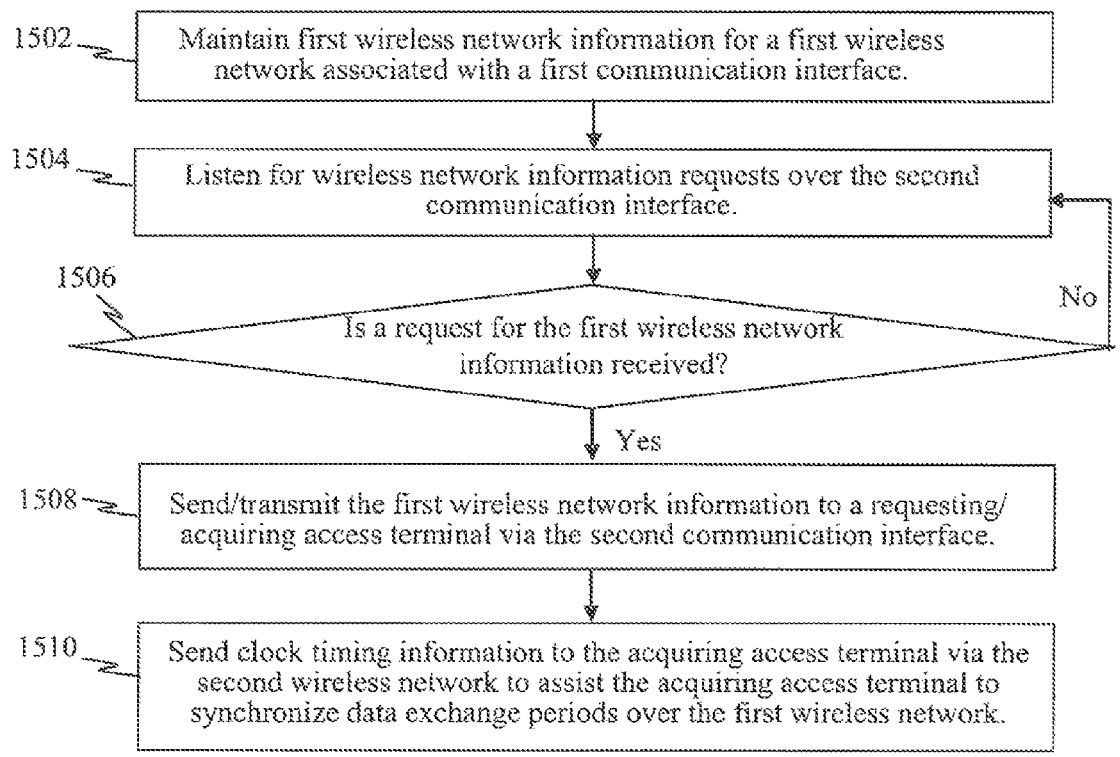
FIG. 15 illustrates a method operational on an assisting access terminal for performing assisted initial network acquisition.

FIG. 15 illustrates a method operational on an assisting access terminal for performing assisted initial network acquisition. Maintain first wireless network information for a first wireless network associated with a first communication interface 1502. The assisting wireless terminal may listen for wireless network information requests over the second communication interface 1504. If a request is not received, the assisting access terminal may continue to listen for wireless network information requests 1504. If such request is received 1506, the assisting access terminal sends or transmits the first wireless network information to requesting/acquiring access terminal via the second communication interface 1508. Additionally, the assisting access terminal may also send clock timing information to the acquiring access terminal via the second wireless network to assist the acquiring access terminal to synchronize data exchange periods over the first wireless network 1510. At least one of the first wireless network and second wireless network may be a peer-to-peer network. At least one of the first communication interface and second communication interface may be a short range communication interface. In one example, the first wireless network is an ultra wide band network while the second wireless network is a Bluetooth-compliant network. The first wireless network information may include at least one of a time-frequency code, a frequency, a channel, timing information, a scrambling code and phase for the first wireless network.

One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, and/or functions illustrated in FIGS. 1, 2, 3, 4, 5, 6, 7, 8, 9, 10, 11, 12, 13, 14 and/or 15 may be rearranged and/or combined into a single component, step, or function or embodied in several components, steps, or functions. Additional elements, components, steps, and/or functions may also be added. The apparatus, devices, and/or components illustrated in FIGS. 9, 10, 12 and/or 14 may be configured or adapted to perform one or more of the methods, features, or steps described in FIGS. 11, 13 and/or 15. The features described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, assisted acquisition may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on an access terminal for assisted initial network acquisition of a first wireless network, comprising:
   broadcasting a request for a first wireless network information over a second wireless network;
   receiving the first wireless network information from an assisting access terminal over the second wireless network, wherein the assisting access terminal is already part of a first wireless network associated with the first wireless network information and the first wireless network being of a different type than the second wireless network;
   receiving clock timing information regarding the first wireless network from the assisting access terminal via the second wireless network;
   adjusting the received first wireless network information based on the received clock timing information;
   detecting the first wireless network over the first wireless network based on the received first wireless network information received from the assisting access terminal over the second wireless network; and
   acquiring communication service over the first wireless network through the access terminal different from the assisting access terminal.

2. The method of claim 1, wherein at least one of the first wireless network and second wireless network is a peer-to-peer network.

3. The method of claim 1, wherein the first wireless network is detected and the communication service is acquired via a first communication interface, and the request is broadcasted and the first wireless network information is received via a second communication interface, the first wireless network being of a different type than the second wireless network.

4. The method of claim 3, wherein at least one of the first communication interface and second communication interface is a short range communication interface.

5. The method of claim 1, wherein the first wireless network is an ultra wide band network.

6. The method of claim 1, wherein the second wireless network is a Bluetooth-compliant network.

7. The method of claim 1, wherein the access terminal is starting or resuming operations in an unknown personal area network when it broadcasts the request for the first wireless network information.

8. The method of claim 1, wherein the received first wireless network information includes at least one of a time-frequency code, a frequency, a channel, timing information, a scrambling code, or a phase for the first wireless network.

9. The method of claim 1, further comprising:
   aligning a first clock of the access terminal with a second clock of the assisting access terminal to synchronize data exchange periods over the first wireless network.

10. The method of claim 1, wherein adjusting the received first wireless network information based on the received clock timing information comprises:
    compensating for drift of a common oscillator of the assisting access terminal, wherein the common oscillator drives a first frequency synthesizer associated with the first wireless network and drives a second frequency synthesizer associated with the second wireless network.

11. The method of claim 1, wherein detecting the first wireless network based on the received first wireless network information includes
    tuning a first communication interface to a frequency band identifiable by the received first wireless network information; and
    awaking the first communication interface immediately before the expected start of a broadcasted physical layer (PHY) frame preamble.

12. The method of claim 11, wherein the length of the PHY frame preamble is less than twenty-four symbols.

13. An access terminal comprising:
    a first communication interface for communicating over a first wireless network;
    a second communication interface for communicating over a second wireless network, the first wireless network being of a different type than the second wireless network;
    a processing circuit coupled to the first and second communication interfaces, the processing circuit configured to:
       broadcast a request for first wireless network information over the second wireless network;
       receive the first wireless network information from an assisting access terminal over the second wireless network, wherein the assisting access terminal is already part of the first wireless network associated with the first wireless network information;
receive clock timing information regarding the first wireless network from the assisting access terminal via the second wireless network;
adjust the received first wireless network information based on the received clock timing information;
detect the first wireless network over the first wireless network based on the received first wireless network information received from the assisting access terminal over the second wireless network; and
acquire communication service over the first wireless network through the access terminal different from the assisting access terminal.

14. The access terminal of claim 13, wherein at least one of the first wireless network and second wireless network is a peer-to-peer network.

15. The access terminal of claim 13, wherein at least one of the first communication interface and second communication interface is a short range communication interface.

16. The access terminal of claim 13, wherein the first wireless network is an ultra wide band network.

17. The access terminal of claim 13, wherein the second wireless network is a Bluetooth-compliant network.

18. The access terminal of claim 13, wherein the access terminal is starting or resuming operations in an unknown personal area network when it broadcasts the request for the first wireless network information.

19. The access terminal of claim 13, wherein the received first wireless network information includes at least one of a time-frequency code, a frequency, a channel, timing information, a scrambling code, or a phase for the first wireless network.

20. The access terminal of claim 13, wherein the processing circuit is further configured to:
align a first clock of the access terminal with a second clock of the assisting access terminal to synchronize data exchange periods over the first wireless network.

21. The access terminal of claim 13, wherein adjusting the received first wireless network information based on the received clock timing information comprises:
compensating for drift of a common oscillator of the assisting access terminal, wherein the common oscillator drives a first frequency synthesizer associated with the first wireless network and drives a second frequency synthesizer associated with the second wireless network.

22. The access terminal of claim 13, wherein detecting the first wireless network based on the received first wireless network information includes
tuning a first communication interface to a frequency band identifiable by the received first wireless network information; and
awaking the first communication interface immediately before the expected start of a broadcasted physical layer (PHY) frame preamble.

23. The access terminal of claim 22, wherein the length of the PHY frame preamble is less than twenty-four symbols.

24. An access terminal comprising:
means for broadcasting a request for a first wireless network information over a second wireless network;
means for receiving the first wireless network information from an assisting access terminal over the second wireless network, wherein the assisting access terminal is already part of a first wireless network associated with the first wireless network information and the first wireless network being of a different type than the second wireless network;
means for receiving clock timing information regarding the first wireless network from the assisting access terminal via the second wireless network;
means for adjusting the received first wireless network information based on the received clock timing information;
means for detecting the first wireless network over the first wireless network based on the received first wireless network information received from the assisting access terminal over the second wireless network; and
means for acquiring communication service over the first wireless network through the access terminal different from the assisting access terminal.

25. The access terminal of claim 24, wherein at least one of the first wireless network and second wireless network is a peer-to-peer network.

26. The access terminal of claim 24, wherein the first wireless network is detected and the communication service is acquired via a first communication interface, and the request is broadcasted and the first wireless network information is received via a second communication interface, the first wireless network being of a different type than the second wireless network.

27. The access terminal of claim 26, wherein at least one of the first communication interface and second communication interface is a short range communication interface.

28. The access terminal of claim 24, wherein the first wireless network is an ultra wide band network.

29. The access terminal of claim 24, wherein the second wireless network is a Bluetooth-compliant network.

30. The access terminal of claim 24, wherein the access terminal is starting or resuming operations in an unknown personal area network when it broadcasts the request for the first wireless network information.

31. The access terminal of claim 24, wherein the received first wireless network information includes at least one of a time-frequency code, a frequency, a channel, timing information, a scrambling code, or a phase for the first wireless network.

32. The access terminal of claim 24, further comprising:
means for aligning a first clock of the access terminal with a second clock of the assisting access terminal to synchronize data exchange periods over the first wireless network.

33. The access terminal of claim 24, wherein the means for adjusting the received first wireless network information based on the received clock timing information comprises:
means for compensating for drift of a common oscillator of the assisting access terminal, wherein the common oscillator drives a first frequency synthesizer associated with the first wireless network and drives a second frequency synthesizer associated with the second wireless network.

34. The access terminal of claim 24, further comprising:
means for tuning a first communication interface to a frequency band identifiable by the received first wireless network information; and
means for awaking the first communication interface immediately before the expected start of a broadcasted physical layer (PHY) frame preamble, wherein the length of the PHY frame preamble is less than twenty-four symbols.

35. A non-transitory computer-readable medium comprising instructions for initial network acquisition, which when executed by a processor causes the processor to:
- broadcast a request for a first wireless network information over a second wireless network;
- receive the first wireless network information from an assisting access terminal over the second wireless network, wherein the assisting access terminal is already part of a first wireless network associated with the first wireless network information and the first wireless network being of a different type than the second wireless network;
- receive clock timing information regarding the first wireless network from the assisting access terminal via the second wireless network;
- adjust the received first wireless network information based on the received clock timing information;
- detect the first wireless network over the first wireless network based on the received first wireless network information received from the assisting access terminal over the second wireless network; and
- acquire communication service over the first wireless network through an access terminal different from the assisting access terminal.

36. The non-transitory computer-readable medium of claim 35 further comprising instructions which when executed by a processor causes the processor to:
- align a first clock of the access terminal with a second clock of the assisting access terminal to synchronize data exchange periods over the first wireless network.

37. The non-transitory computer-readable medium of claim 35 further comprising instructions which when executed by a processor causes the processor to:
- tune a first communication interface to a frequency band identifiable by the received first wireless network information; and
- awake the first communication interface immediately before the expected start of a broadcasted physical layer (PHY) frame preamble, wherein the length of the PHY frame preamble is less than twenty-four symbols.

38. A method operational on an access terminal for assisting an acquiring access terminal in initial network acquisition, comprising:
- maintaining first wireless network information for a first wireless network associated with a first communication interface, wherein the access terminal is already part of the first wireless network and the first wireless network being of a different type than a second wireless network;
- receiving a request for the first wireless network information from the acquiring access terminal over a second communication interface associated with the second wireless network;
- sending the first wireless network information to the acquiring access terminal via the second communication interface to assist the acquiring access terminal in detecting the first wireless network over the first wireless network utilizing the first wireless network information; and
- sending clock timing information regarding the first wireless network to the acquiring access terminal via the second communication interface to assist the acquiring access terminal to synchronize data exchange periods over the first wireless network and to adjust the first wireless network information.

39. The method of claim 38, wherein at least one of the first wireless network and second wireless network is a peer-to-peer network.

40. The method of claim 38, wherein at least one of the first communication interface and second communication interface is a short range communication interface.

41. The method of claim 38, wherein the first wireless network is an ultra wide band network.

42. The method of claim 38, wherein the second wireless network is a Bluetooth-compliant network.

43. The method of claim 38, wherein the first wireless network information sent includes at least one of a time-frequency code, a frequency, a channel, timing information, a scrambling code, or a phase for the first wireless network.

44. An access terminal comprising:
- a first communication interface for communicating over a first wireless network;
- a second communication interface for communicating over a second wireless network, the first wireless network being of a different type than the second wireless network;
- a processing circuit coupled to the first and second communication interfaces, the processing circuit configured to:
  - maintain first wireless network information for the first wireless network, wherein the access terminal is already part of the first wireless;
  - receive a request for the first wireless network information from an acquiring access terminal over the second communication interface;
  - send the first wireless network information to the acquiring access terminal via the second communication interface to assist the acquiring access terminal in detecting the first wireless network over the first wireless network utilizing the first wireless network information; and
  - send clock timing information regarding the first wireless network to the acquiring access terminal via the second communication interface to assist the acquiring access terminal to synchronize data exchange periods over the first wireless network and to adjust the first wireless network information.

45. The access terminal of claim 44, wherein at least one of the first wireless network and second wireless network is a peer-to-peer network.

46. The access terminal of claim 44, wherein at least one of the first communication interface and second communication interface is a short range communication interface.

47. The access terminal of claim 44, wherein the first wireless network is an ultra wide band network.

48. The access terminal of claim 44, wherein the second wireless network is a Bluetooth-compliant network.

49. The access terminal of claim 44, wherein the first wireless network information sent includes at least one of a time-frequency code, a frequency, a channel, timing information, a scrambling code, or a phase for the first wireless network.

50. An access terminal comprising:
- means for maintaining first wireless network information for a first wireless network associated with a first communication interface, wherein the access terminal is already part of the first wireless network and the first wireless network being of a different type than a second wireless network;
- means for receiving a request for the first wireless network information from an acquiring access terminal over a second communication interface associated with the second wireless network;
- means for sending the first wireless network information to the acquiring access terminal via the second communication interface to assist the acquiring access terminal in detecting the first wireless network over the first wireless network utilizing the first wireless network information; and means for sending clock timing information regarding the first wireless network to the acquiring access terminal via the second communication interface to assist the acquiring access terminal to synchronize data exchange periods over the first wireless network and to adjust the first wireless network information.

51. The access terminal of claim 50, wherein at least one of the first wireless network and second wireless network is a peer-to-peer network.

52. The access terminal of claim 50, wherein at least one of the first communication interface and second communication interface is a short range communication interface.

53. The access terminal of claim 50, wherein the first wireless network is an ultra wide band network.

54. The access terminal of claim 50, wherein the second wireless network is a Bluetooth-compliant network.

55. The access terminal of claim 50, wherein the first wireless network information sent includes at least one of a time-frequency code, a frequency, a channel, timing information, a scrambling code, or a phase for the first wireless network.

56. A non-transitory computer-readable medium comprising instructions for an access terminal to assist an acquiring access terminal in initial network acquisition of a first wireless network, which when executed by a processor causes the processor to:

maintain first wireless network information for the first wireless network associated with a first communication interface, wherein the access terminal is already part of the first wireless network and the first wireless network being of a different type than a second wireless network;

receive a request for the first wireless network information from the acquiring access terminal over a second communication interface associated with the second wireless network;

send the first wireless network information to the acquiring access terminal via the second communication interface to assist the acquiring access terminal in detecting the first wireless network over the first wireless network utilizing the first wireless network information; and send clock timing information regarding the first wireless network to the acquiring access terminal via the second communication interface to assist the acquiring access terminal to synchronize data exchange periods over the first wireless network and to adjust the first wireless network information.

57. The non-transitory computer-readable medium of claim 56, wherein at least one of the first wireless network and second wireless network is a peer-to-peer network, and at least one of the first communication interface and second communication interface is a short range communication interface.

* * * * *